(12) United States Patent
McKeown

(10) Patent No.: US 6,212,182 B1
(45) Date of Patent: Apr. 3, 2001

(54) COMBINED UNICAST AND MULTICAST SCHEDULING

(75) Inventor: Nicholas W. McKeown, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/673,216

(22) Filed: Jun. 27, 1996

(51) Int. Cl.$^7$ .................................................. H04L 12/56
(52) U.S. Cl. .................... 370/390; 370/416; 370/432; 709/240
(58) Field of Search ................................. 370/355, 386, 370/388, 389, 390, 395, 398, 411, 412, 415, 416, 428, 429, 445, 447, 432; 359/117, 128, 135, 139; 709/213, 238, 240

(56) References Cited

U.S. PATENT DOCUMENTS

| Re. 33,900 | 4/1992 | Howson | 370/514 |
| 4,131,767 | 12/1978 | Weinstein | 179/170.2 |
| 4,161,719 | 7/1979 | Parikh et al. | 340/147 |
| 4,316,284 | 2/1982 | Howson | 370/105 |
| 4,397,020 | 8/1983 | Howson | 370/105 |
| 4,419,728 | 12/1983 | Larson | 364/200 |
| 4,424,565 | 1/1984 | Larson | 364/200 |

(List continued on next page.)

FOREIGN PATENT DOCUMENTS

| 0 384 758 | 2/1990 | (EP) | H04L/12/56 |
| 0 384 758 A2 | 8/1990 | (EP) . | |
| 0 431 751 A1 | 11/1990 | (EP) | H04L/12/46 |

(List continued on next page.)

OTHER PUBLICATIONS

Chowdhury, et al., "Alternative Banddwidth Allocation Algorithms for Packet Video in ATM Networks", 1992, IEEE Infocom 92, pp. 1061–1068.

Zhang, et al., "Rate–Controlled Static–Priority Queueing", 1993, IEEE, pp. 227–236.

Doeringer, et al., "Routing on Longest–Matching Prefixes", IEEE ACM Transactions on Networking, Feb. 1, 1996, vol. 4, No. 1, pp. 86–97.

(List continued on next page.)

Primary Examiner—Alpus H. Hsu
(74) Attorney, Agent, or Firm—Skjerven Morrill MacPherson; Paul E. Lewkowicz, Esq.

(57) ABSTRACT

The invention provides a method and system for combined unicast and multicast scheduling. Data cells are assigned at each input, to one unicast input queue for each output, or to a single multicast input queue. Each input makes two requests for scheduling to each output for which it has a queued data cell, one unicast request and one multicast request. Each output grants up to one request, choosing highest priority requests first, giving precedence to one such highest priority request using an output precedence pointer, either an individual output precedence pointer which is specific to that output for unicast data cells, or a group output precedence pointer which is generic to all outputs for multicast data cells. Each input accepts up to one grant for unicast data cells, or as many grants as possible for multicast data cells, choosing highest priority grants first, giving precedence to one such highest priority grant using an input precedence pointer. In a preferred embodiment, the individual output precedence pointers each implement a round-robin precedence technique, in which the most recent input to transmit a data cell has the lowest precedence; the pointer is incremented to point to a next input each time a data cell is transmitted from the pointed-to input. The input precedence pointers each preferably implement an identical precedence technique. However, the group output precedence pointer is not incremented until all outputs from the multicast data cell for the pointed-to input have been transmitted.

41 Claims, 2 Drawing Sheets

U.S. PATENT DOCUMENTS

| | | | |
|---|---|---|---|
| 4,437,087 | 3/1984 | Petr | 341/51 |
| 4,438,511 | 3/1984 | Baran | 370/204 |
| 4,439,763 | 3/1984 | Limb | 340/825.5 |
| 4,445,213 | 4/1984 | Baugh et al. | 370/94 |
| 4,446,555 | 5/1984 | Devault et al. | 370/94 |
| 4,456,957 | 6/1984 | Schieltz | 364/200 |
| 4,464,658 | 8/1984 | Thelen | 340/825.5 |
| 4,499,576 | 2/1985 | Fraser | 370/60 |
| 4,506,358 | 3/1985 | Montgomery | 370/409 |
| 4,507,760 | 3/1985 | Fraser | 365/221 |
| 4,532,626 | 7/1985 | Flores et al. | 370/85 |
| 4,644,532 | 2/1987 | George et al. | 370/94 |
| 4,646,287 | 2/1987 | Larson et al. | 370/400 |
| 4,677,423 | 6/1987 | Benvenuto et al. | 341/51 |
| 4,679,189 * | 7/1987 | Olson et al. | 370/60 |
| 4,679,227 | 7/1987 | Hughes-Hartogs | 379/93.31 |
| 4,723,267 | 2/1988 | Jones et al. | 379/93.05 |
| 4,731,816 | 3/1988 | Hughes-Hartogs | 379/93.31 |
| 4,750,136 | 6/1988 | Arpin et al. | 395/830 |
| 4,757,495 | 7/1988 | Decker et al. | 370/477 |
| 4,763,191 | 8/1988 | Gordon et al. | 358/86 |
| 4,769,810 | 9/1988 | Eckberg, Jr. et al. | 370/232 |
| 4,769,811 | 9/1988 | Eckberg, Jr. et al. | 370/236 |
| 4,771,425 | 9/1988 | Baran et al. | 370/85 |
| 4,819,228 | 4/1989 | Baran et al. | 370/85 |
| 4,827,411 | 5/1989 | Arrowood et al. | 364/300 |
| 4,833,706 | 5/1989 | Hughes-Hartogs | 379/93.31 |
| 4,835,737 | 5/1989 | Herrig et al. | 375/283 |
| 4,879,551 | 11/1989 | Georgiou et al. | 340/825.87 |
| 4,893,306 | 1/1990 | Chao et al. | 370/94.2 |
| 4,903,261 | 2/1990 | Baran et al. | 370/94.2 |
| 4,922,486 | 5/1990 | Lidinsky et al. | 370/427 |
| 4,933,937 | 6/1990 | Konishi | 370/85.13 |
| 4,960,310 | 10/1990 | Cushing | 359/888 |
| 4,962,497 | 10/1990 | Ferenc et al. | 370/60.1 |
| 4,962,532 | 10/1990 | Kasiraj et al. | 380/25 |
| 4,965,767 | 10/1990 | Kinoshita et al. | 365/49 |
| 4,965,772 | 10/1990 | Daniel et al. | 364/900 |
| 4,970,678 | 11/1990 | Sladowski et al. | 364/900 |
| 4,979,118 | 12/1990 | Kheradpir | 364/436 |
| 4,980,897 | 12/1990 | Decker et al. | 375/265 |
| 4,991,169 | 2/1991 | Davis et al. | 370/77 |
| 5,003,595 | 3/1991 | Collins et al. | 380/25 |
| 5,014,265 | 5/1991 | Hahne et al. | 370/236 |
| 5,020,058 | 5/1991 | Holden et al. | 370/190 |
| 5,033,076 | 7/1991 | Jones et al. | 379/67 |
| 5,034,919 | 7/1991 | Sassai et al. | 365/49 |
| 5,054,034 | 10/1991 | Hughes-Hartogs | 375/222 |
| 5,059,925 | 10/1991 | Weisbloom | 331/1 A |
| 5,072,449 | 12/1991 | Enns et al. | 371/37.1 |
| 5,088,032 | 2/1992 | Bosack | 395/200 |
| 5,095,480 * | 3/1992 | Fenner | 370/94.1 |
| 5,115,431 | 5/1992 | Williams et al. | 370/94.1 |
| 5,128,945 | 7/1992 | Enns et al. | 371/37.1 |
| 5,136,580 | 8/1992 | Videlock et al. | 370/60 |
| 5,166,930 | 11/1992 | Braff et al. | 370/94.1 |
| 5,199,049 | 3/1993 | Wilson | 375/104 |
| 5,206,886 | 4/1993 | Bingham | 375/344 |
| 5,208,811 | 5/1993 | Kashio et al. | . |
| 5,212,686 | 5/1993 | Joy et al. | 370/60 |
| 5,224,099 | 6/1993 | Corbalis et al. | 370/94.2 |
| 5,226,120 | 7/1993 | Brown et al. | 395/200 |
| 5,228,062 | 7/1993 | Bingham | 375/344 |
| 5,229,994 | 7/1993 | Balzano et al. | 370/85.13 |
| 5,237,564 | 8/1993 | Lespagnol et al. | 370/60.1 |
| 5,241,682 | 8/1993 | Bryant et al. | 395/800 |
| 5,243,342 | 9/1993 | Kattemalalavadi et al. | 341/106 |
| 5,243,596 | 9/1993 | Port et al. | 370/94.1 |
| 5,247,516 | 9/1993 | Bernstein et al. | 370/468 |
| 5,249,178 | 9/1993 | Kurano et al. | 370/60 |
| 5,255,291 | 10/1993 | Holden et al. | 375/111 |
| 5,260,933 | 11/1993 | Rouse | 370/14 |
| 5,260,978 | 11/1993 | Fleisher et al. | 375/106 |
| 5,268,592 | 12/1993 | Bellamy et al. | 307/43 |
| 5,268,900 | 12/1993 | Hluchj et al. | 370/94.1 |
| 5,271,004 | 12/1993 | Proctor et al. | 370/60 |
| 5,274,631 | 12/1993 | Bhardwaj | 370/60 |
| 5,274,635 | 12/1993 | Rahman et al. | 370/60.1 |
| 5,274,643 | 12/1993 | Fisk | 370/94.1 |
| 5,280,470 | 1/1994 | Buhrke et al. | 370/232 |
| 5,280,480 | 1/1994 | Pitt et al. | 370/85.13 |
| 5,280,500 | 1/1994 | Mazzola et al. | 375/17 |
| 5,283,783 | 2/1994 | Nguyen et al. | 370/16.1 |
| 5,287,103 | 2/1994 | Kasprzyk et al. | 340/825.52 |
| 5,287,453 * | 2/1994 | Roberts | 395/200 |
| 5,291,482 | 3/1994 | McHarg et al. | 370/60 |
| 5,301,333 * | 4/1994 | Lee | 370/416 |
| 5,305,311 | 4/1994 | Lyles | 370/60 |
| 5,307,343 | 4/1994 | Bostica et al. | 370/60 |
| 5,309,437 | 5/1994 | Perlman et al. | 370/85.13 |
| 5,311,509 | 5/1994 | Heddes et al. | 370/60 |
| 5,313,454 | 5/1994 | Bustini et al. | 370/13 |
| 5,313,582 | 5/1994 | Hendel et al. | 395/250 |
| 5,317,562 | 5/1994 | Nardin et al. | 370/16 |
| 5,319,644 | 6/1994 | Liang | 370/85.5 |
| 5,327,421 | 7/1994 | Hiller et al. | 370/395 |
| 5,331,637 | 7/1994 | Francis et al. | 370/54 |
| 5,345,445 | 9/1994 | Hiller et al. | 370/358 |
| 5,345,446 | 9/1994 | Hiller et al. | 370/358 |
| 5,357,506 * | 10/1994 | Sugawara | 370/416 |
| 5,359,592 | 10/1994 | Corbalis et al. | 370/17 |
| 5,361,250 | 11/1994 | Nguyen et al. | 370/16.1 |
| 5,361,256 | 11/1994 | Doeringer et al. | 370/60 |
| 5,361,259 | 11/1994 | Hunt et al. | 370/84 |
| 5,365,524 | 11/1994 | Hiller et al. | 370/376 |
| 5,367,517 | 11/1994 | Cidon et al. | 370/431 |
| 5,371,852 | 12/1994 | Attanasio et al. | 395/200.75 |
| 5,386,567 | 1/1995 | Lien et al. | 395/700 |
| 5,390,170 | 2/1995 | Sawant et al. | 370/58.1 |
| 5,390,175 | 2/1995 | Hiller et al. | 370/398 |
| 5,392,280 * | 2/1995 | Zheng | 370/231 |
| 5,394,394 | 2/1995 | Crowther et al. | 370/60 |
| 5,394,402 | 2/1995 | Ross | 370/94.1 |
| 5,400,325 | 3/1995 | Chatwani et al. | 370/60.1 |
| 5,408,469 | 4/1995 | Opher et al. | 370/60.1 |
| 5,416,842 | 5/1995 | Aziz | 380/30 |
| 5,422,880 | 6/1995 | Heitkamp et al. | 370/60 |
| 5,422,882 | 6/1995 | Hiller et al. | 370/352 |
| 5,423,002 | 6/1995 | Hart | 395/200 |
| 5,426,636 | 6/1995 | Hiller et al. | 370/352 |
| 5,428,607 | 6/1995 | Hiller et al. | 370/352 |
| 5,430,715 | 7/1995 | Corbalis et al. | 370/54 |
| 5,430,729 | 7/1995 | Rahnema | . |
| 5,442,457 | 8/1995 | Najafi | 358/400 |
| 5,442,630 | 8/1995 | Gagliardi et al. | 370/85.13 |
| 5,448,559 * | 9/1995 | Hayter et al. | 370/416 |
| 5,452,297 | 9/1995 | Hiller et al. | 370/395 |
| 5,473,599 | 12/1995 | Li et al. | 370/16 |
| 5,473,607 | 12/1995 | Hausman et al. | 370/85.13 |
| 5,477,541 * | 12/1995 | White et al. | 370/94.1 |
| 5,485,455 | 1/1996 | Dobbins et al. | 370/60 |
| 5,490,140 | 2/1996 | Abensour et al. | . |
| 5,490,258 * | 2/1996 | Fenner | 395/401 |
| 5,491,687 | 2/1996 | Christensen et al. | 370/17 |
| 5,491,804 | 2/1996 | Heath et al. | 395/275 |
| 5,497,368 | 3/1996 | Reijnierse et al. | . |
| 5,504,747 | 4/1996 | Sweasey | . |
| 5,509,006 | 4/1996 | Wilford et al. | 370/60 |
| 5,517,494 | 5/1996 | Green | . |
| 5,519,704 | 5/1996 | Farinacci et al. | 370/85.13 |
| 5,519,858 | 5/1996 | Walton et al. | 395/600 |

| | | | |
|---|---|---|---|
| 5,526,489 | 6/1996 | Nilakantan et al. | 395/200.02 |
| 5,530,963 | 6/1996 | Moore et al. | 395/200.15 |
| 5,535,195 | 7/1996 | Lee | 370/256 |
| 5,539,734 | 7/1996 | Burwell et al. | |
| 5,541,911 | 7/1996 | Nilakantan et al. | |
| 5,546,370 | 8/1996 | Ishikawa | |
| 5,555,244 | 9/1996 | Gupta et al. | 370/60 |
| 5,561,669 | 10/1996 | Lenney et al. | 370/60.1 |
| 5,572,522 * | 11/1996 | Calamvokis et al. | 370/390 |
| 5,577,035 * | 11/1996 | Hayter et al. | 370/412 |
| 5,583,862 | 12/1996 | Callon | 370/397 |
| 5,592,470 | 1/1997 | Rudrapatna et al. | 370/320 |
| 5,598,581 | 1/1997 | Daines et al. | 395/872 |
| 5,600,798 | 2/1997 | Cherukuri et al. | |
| 5,602,770 | 2/1997 | Ohira | 365/49 |
| 5,604,868 | 2/1997 | Komine et al. | 395/200 |
| 5,608,726 | 3/1997 | Virgile | |
| 5,617,417 | 4/1997 | Sathe et al. | 370/394 |
| 5,617,421 | 4/1997 | Chin et al. | 370/402 |
| 5,630,125 * | 5/1997 | Zellweger | 395/614 |
| 5,631,908 * | 5/1997 | Saxe | 370/235 |
| 5,632,021 | 5/1997 | Jennings et al. | 395/309 |
| 5,634,010 | 5/1997 | Ciscon et al. | 395/200 |
| 5,638,359 | 6/1997 | Peltola et al. | |
| 5,644,718 | 7/1997 | Belove et al. | 395/200 |
| 5,659,684 | 8/1997 | Giovannoni et al. | |
| 5,666,353 | 9/1997 | Klausmeier et al. | 370/230 |
| 5,673,265 | 9/1997 | Gupta et al. | 370/432 |
| 5,678,006 | 10/1997 | Valizadeh et al. | 395/200 |
| 5,680,116 | 10/1997 | Hashimoto et al. | |
| 5,684,797 * | 11/1997 | Aznar et al. | 370/390 |
| 5,687,324 * | 11/1997 | Green et al. | 370/396 |
| 5,689,505 * | 11/1997 | Chiussi et al. | 370/390 |
| 5,689,506 * | 11/1997 | Chiussi et al. | 370/388 |
| 5,694,390 | 12/1997 | Yamato et al. | |
| 5,724,351 * | 3/1998 | Chao et al. | 370/395 |
| 5,740,097 | 4/1998 | Satch | 365/49 |
| 5,748,186 * | 5/1998 | Raman | 345/302 |
| 5,748,617 | 5/1998 | McLain, Jr. | |
| 5,754,547 | 5/1998 | Nakazawa | 370/401 |
| 5,802,054 | 9/1998 | Bellenger | |
| 5,835,710 * | 11/1998 | Nagami et al. | 395/200.8 |
| 5,841,874 | 11/1998 | Kempke et al. | 713/160 |
| 5,854,903 | 12/1998 | Morrison et al. | 709/249 |
| 5,856,981 | 1/1999 | Voelker | |
| 5,892,924 | 4/1999 | Lyon et al. | 395/200.75 |
| 5,898,686 | 4/1999 | Virgile | 370/381 |
| 5,898,687 * | 4/1999 | Harriman et al. | 370/390 |
| 5,903,559 | 5/1999 | Acharya et al. | |

FOREIGN PATENT DOCUMENTS

| | | | |
|---|---|---|---|
| 0 431 751 A1 | 6/1991 | (EP) . | |
| 0 567 217 A2 | 10/1993 | (EP) . | |
| 567 217 A2 | 10/1993 | (EP) | H04L/12/46 |
| WO 93/07569 | 4/1993 | (WO) | G06F/13/40 |
| WO 93/07692 | 4/1993 | (WO) | H04J/3/24 |
| WO93/07569 | 4/1993 | (WO) . | |
| WO93/07692 | 4/1993 | (WO) . | |
| WO 94/01828 | 1/1994 | (WO) | G06F/15/40 |
| WO94/01828 | 1/1994 | (WO) . | |
| WO 95/20850 | 8/1995 | (WO) | H04L/12/56 |
| WO95/20850 | 8/1995 | (WO) . | |

OTHER PUBLICATIONS

IBM, "Method and Apparatus for the Statistical Multiplexing of Voice, Data, and Image Signals", Nov., 1992, IBM Technical Data Bulletin n6 11–92, pp. 409–411.

Esaki, et al. "Datagram Delivery in an ATM–Internet," IEICE Transactions on Communications vol. E77–B, No. 3, (1994) Mar. Tokyo, Japan.

Allen, M., "Novell IPX Over Various WAN Media (IPX-WAN)", Network Working Group, RFC 1551, Dec. 1993, pp. 1–22.

Becker, D., 3c589.c: A 3c589 EtherLink3 ethernet driver for linux, becker@CESDIS.gsfc.nasa.gov, May 3, 1994, pp. 1–13.

Pei, et al., "Putting Routing Tables in Silicon", IEEE Network magazine, Jan. 1992, p. 42–50.

Perkins, D., "Requirements for an Internet Standard Point–to–Point Protocol", Network Working Group, RFC 1547, Dec. 1993, pp. 1–19.

Simpson, W., "The Point–to–Point Protocol (PPP)", Network Working Group, RFC 1548, Dec. 1993, pp. 1–53.

Tusuchiya, P.F. "A Search Algorithm for Table Entries with NonContinguous Wildcarding", Abstract, Bellcore.

Allen, M., "Novell IPX Over Various WAN Media (IPXWAN)," Network Working Group, RFC 1551, Dec. 1993, pp. 1–22.

Becker, D., "3c589.c: A 3c589 EtherLink3 ethernet driver for linux," becker@CESDIS.gsfc.nasa.gov, May 3, 1994, pp. 1–13.

Chowdhury, et al. "Alternative Bandwidth Allocation Algorithms for Packet Video in ATM Networks," INFOCOM 1992, pp. 1061–1068.

Doeringer, W., "Routing of Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point–to–Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Tsuchiya, P.F., "A Search Algorithm for Table Entries with Non–Contiguous Wildcarding," Abstract, Bellcore.

Zhang, et al., "Rate–Controlled Static–Priority Queueing," INFOCOM 1993, pp. 227–236.

William Stallings, Data and Computer Communications, PP: 329–333, Prentice Hall, Upper Saddle River, New Jersey 07458.

* cited by examiner

COMBINED UNICAST AND MULTICAST SCHEDULING

BACKGROUND OF THE INVENTION

1. Field of the Invention

This invention relates to combined unicast and multicast scheduling.

2. Description of Related Art

In communication networks in which fast switching is desired, one switching technique which has become common is to property that each possible input may be coupled to each possible output, and that data cells to be switched are queued at the input to the switch without effect on operation of the switch.

It often occurs in such switches that several inputs will simultaneously contend for the same output, and moreover that one input will simultaneously have data cells available for more than one output. Several techniques are known for selecting which input to couple to which output at each particular switching time, so as to achieve the greatest possible data cell flow through the switch, while ensuring that every input is communicated to its desired output within a reasonable time.

U.S. Pat. No. 5,267,235, titled "Method and Apparatus for Resource Arbitration", issued in the name of Charles P. Thacker and assigned to Digital Equipment Corporation, describes one switching technique, herein called "Parallel Iterative Matching" or PIM. In the PIM technique, unmatched inputs and outputs are scheduled by a three-part process, in which (!) each unmatched input sends a request to every output for which it has a queued data cell; (2) each unmatched output which receives at least one request selects among them randomly and grants the selected request; and (3) each input which receives at least one grant selects among them and accepts the selected grant.

Nicolas McKeown's Ph.D. Thesis at the University of California (Berkeley), titled "Scheduling Cells in an Input Queued Switch", submitted May 1995, describes another switching technique, herein called "Rotating Priority Iterative Matching" or RPIM. The RPIM technique improves on the PIM technique by introducing a grant precedence pointer at each output which rotates among the unmatched inputs, and requiring each output to grant to the input nearest the grant precedence pointer in preference to all other inputs.

One problem which has arisen in the art is that the input cells are often an intermixed stream of unicast cells (destined for a single output) and multicast cells (destined for more than one output). Both the PIM technique and the RPIM technique suffer from the drawback that they are not well suited for switching multicast data cells.

Another problem which has arisen in the art is that it is often desired to assign priorities to data cells, so that, for example, data cells carrying certain classes of data are more likely to arrive at their destination without excess switching delays. Both the PIM technique and the RPIM technique suffer from the drawback that they are complicated by attempts to simultaneously switch multiple priorities of data cells.

When the input stream of data cells intermixes both unicast and multicast data cells, each data cell being prioritized with one of multiple priorities, the PIM technique and the RPIM technique do not achieve satisfactory results.

Accordingly, it would be advantageous to provide a technique for combined unicast and multicast scheduling, and further to provide a technique for combined unicast and multicast scheduling which operates well with prioritized data cells.

SUMMARY OF THE INVENTION

The invention provides a method and system for combined unicast and multicast scheduling. Data cells are assigned at each input, to one unicast input queue for each output, or to a single multicast input queue. Each input makes two requests for scheduling to each output for which it has a queued data cell, one unicast request and one multicast request. Each output grants up to one request, choosing highest priority requests first, giving precedence to one such highest priority request using an output precedence pointer, either an individual output precedence pointer which is specific to that output for unicast data cells, or a group output precedence pointer which is generic to all outputs for multicast data cells. Each input accepts up to one grant for unicast data cells, or as many grants as possible for multicast data cells, choosing highest priority grants first, giving precedence to one such highest priority grant using an input precedence pointer.

In a preferred embodiment, the individual output precedence pointers each implement a round-robin precedence technique, in which the most recent input to transmit a data cell has the lowest precedence; the pointer is incremented to point to a next input each time a data cell is transmitted from the pointed-to input. The input precedence pointers each preferably implement an identical precedence technique. However, the group output precedence pointer is not incremented until all outputs from the multicast data cell for the pointed-to input have been transmitted.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

OVERVIEW OF THE METHOD FOR SCHEDULING

In the method for scheduling, unicast and multicast data cells are received in an input stream and are queued separately for input. Each unicast data cell is queued in a unicast input queue directed to its particular output destination. Multicast data cells are separately queued in a single multicast input queue which is directed to a plurality of output destinations. Because multicast data cells might not be directed to all possible output destinations (if so they would be called "broadcast" data cells), they are tagged with output identifiers for all of their output destinations.

The method for scheduling includes three parts:

1. Each input makes requests to its output destinations, one for each unicast input queue and one for the multicast input queue.

2. Each output examines its received requests and grants the request of the input whose associated data cell has the highest priority and precedence. Priority is determined by priority tags assigned to the data cells. Precedence is determined for unicast data cells by an individual precedence pointer for each output, which is updated using a round-robin technique as unicast data cells are transmitted. Precedence is determined for multicast data cells by a group precedence pointer for all outputs collectively, which is updated using a round-robin technique as multicast data cells are transmitted.

3. Each input examines its received grants and accepts the grant of the output which allows transmission of the data cell with the highest priority and precedence. Precedence is determined for unicast data cells by a precedence pointer for each input, which is updated using a round-robin technique as unicast data cells are transmitted. Multicast data cells are simply transmitted to all outputs which grant the request (unless a specific output has a higher-priority unicast data cell to be transmitted).

Those inputs and outputs which are scheduled using this technique are removed from consideration and the technique is reapplied until all inputs and all outputs are scheduled or until another termination criterion is met (e.g., until expiration of a timer or until a fixed number of reapplications are performed).

When scheduling of inputs and outputs is complete, data cells are transmitted according to the schedule and precedence pointers are updated.

SWITCH WITH UNICAST AND MULTICAST QUEUES

Figure 1:
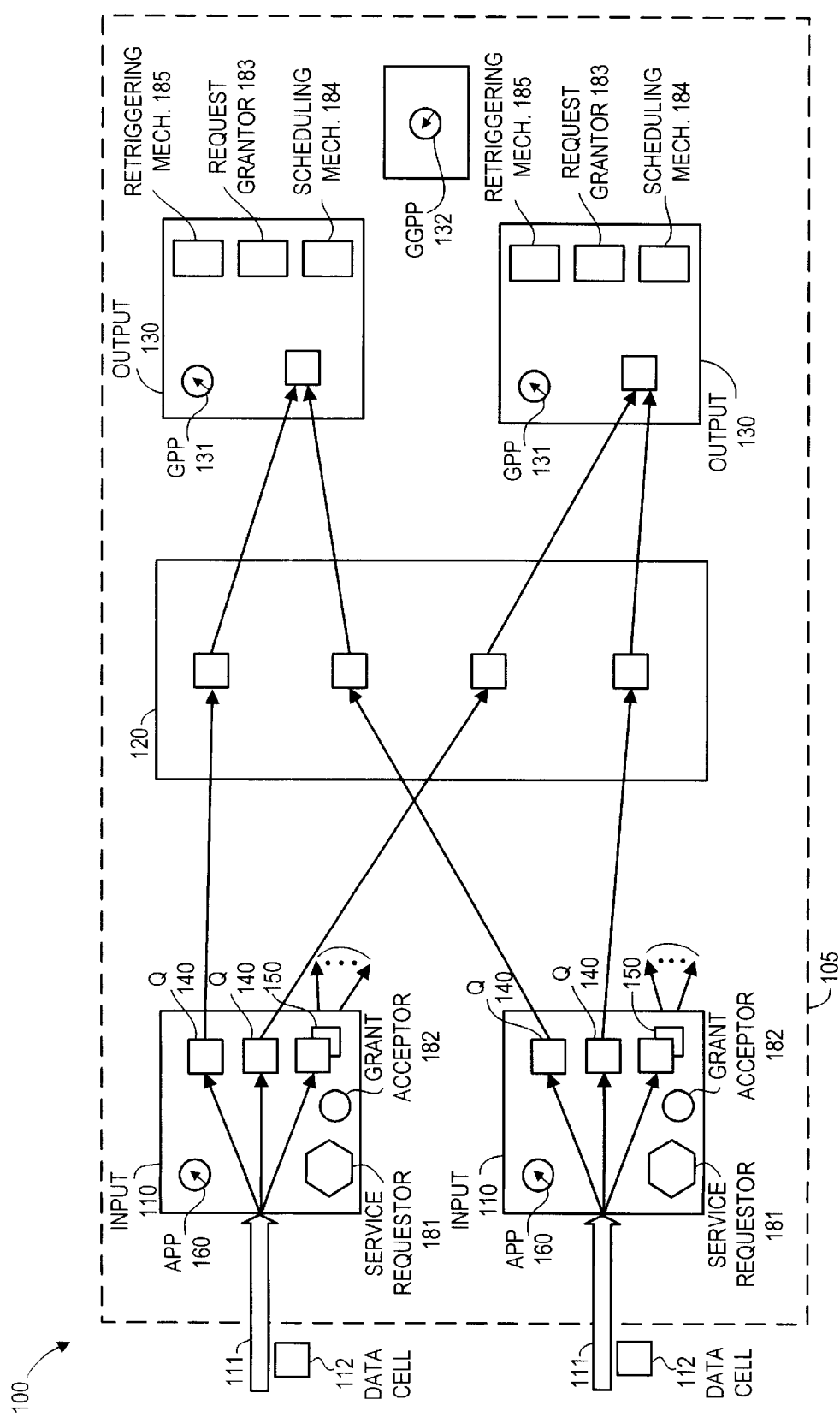
FIG. 1 shows a switch with unicast and multicast queues.

FIG. 1 shows a switch with unicast and multicast queues.

A system 100 for switching unicast and multicast data cells comprises a plurality of M inputs 110, a nonblocking M×N switch 120, and a plurality of N outputs 130. System 100 may be implemented, in some embodiments, in a memory 105.

In a preferred embodiment, the switch 120 comprises a crossbar switch. However, in alternative embodiments, the switch 120 may comprise a Batcher-Banyan self-routing switch or any other nonblocking switch architecture.

In a preferred embodiment, the switch 120 has 16 inputs and 16 outputs; thus, M=16 and N=16. However, in alternative embodiments, the switch 120 may have any other number of inputs or outputs; thus, M and N may take on any other values. Although in a preferred embodiment, M=16 and N=16, the switch 120 is illustrated here for simplicity with M=2 and N=2; it would be immediately clear to those skilled in the art, after perusing this application, how to make and use the invention with other values of M and N.

Each input 110 is coupled to an input stream 111 of data cells 112. Each data cell 112 comprises a data payload, an output identifier, and a priority tag.

The data payload includes the data which is transmitted with the data cell 112 from the input 110 to the output 130, and may further include control information such as parity, CRC bits, or flow control, all of which have no effect on the operation of the switch 120.

The output identifier is a value which selects among the N outputs 130.

The priority tag is a value which selects among a plurality of possible priorities. In a preferred embodiment, there are 8 possible priorities, which 0 indicating the highest priority and 7 indicating the lowest priority. However, in alternative embodiments, a different number or different tagging values for priorities may be used.

In a preferred embodiment, each data cell 112 has a uniform length. In alternative embodiments, data cells 112 may have variable lengths; however, those variable lengths should generally be less than one switching time for the switch 120 to avoid complicating the scheduling technique.

Each input 110 comprises a plurality of unicast input queues 140, a multicast input queue 150, a service requestor 181, a grant acceptor 182, and an accept precedence pointer (map) 160.

Each unicast input queue 140 is coupled using the switch 120 to a single output 130. Thus, data cells 112 in a unicast input queue 140 are specifically directed to its associated output 130.

The multicast input queue 150 is coupled, using the switch 120, to all the outputs 130. Thus, data cells 112 in the multicast input queue 150 may be directed to any one or more of the outputs 130.

The accept precedence pointer 160 points to a single output 130.

Each output 130 comprises a grant precedence pointer (GPP) 131, a request grantor 183, a scheduling mechanism 184, and a retriggering mechanism 185. The grant pointer 131 points to a single input 110.

The system 100 also comprises a group grant precedence pointer (GGPP) 132. The group grant pointer 132 points to a single input 110.

METHOD OF SCHEDULING INTERMIXED UNICAST AND MULTICAST DATA CELLS

Figure 2:
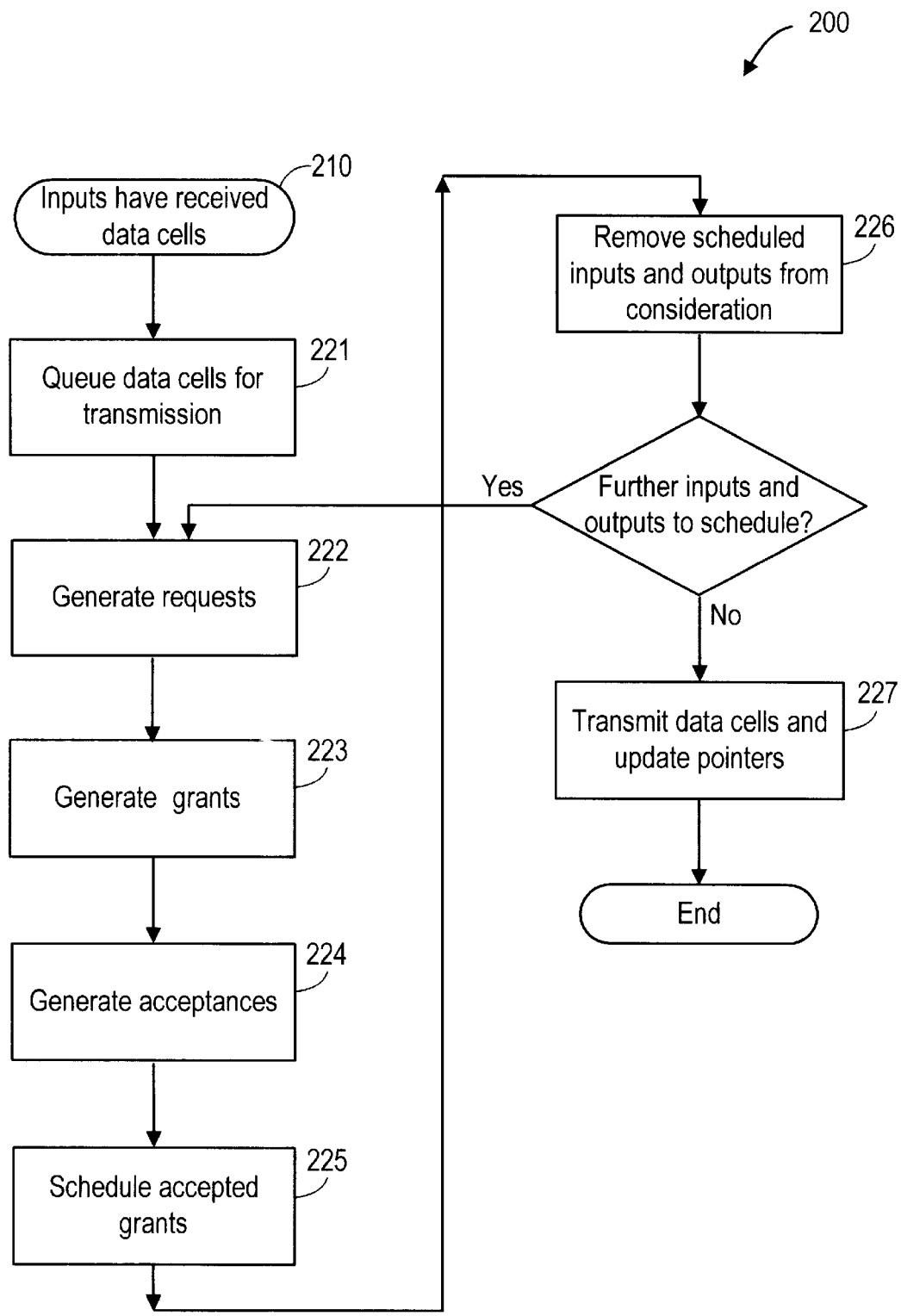
FIG. 2 shows a method of scheduling a input stream of intermixed unicast and multicast data cells.

FIG. 2 shows a method of scheduling an input stream of intermixed unicast and multicast data cells.

A method 200 is executed by the inputs 110, the switch 120, and the outputs 130, using the grant precedence pointer 131, the group grant precedence pointer 132, and the accept precedence pointer 160.

It would be clear to those skilled in the art that the inputs 110, the switch 120, and the outputs 130 may comprise appropriate devices for carrying out the steps described herein, and that such appropriate devices may comprise either specialpurpose hardware or a general-purpose computing element operating under control of appropriate software.

At a flow point 210, the inputs 110 have received data cells 112 for transmission to the outputs 130. At this flow point, the grant precedence pointer 131 and the group grant precedence pointer 132 may point to any output 130; the accept precedence pointer 160 may point to any input 110.

At a step 221, the inputs 110 queue the received data cells 112 for transmission. Unicast data cells 112 are queued in the unicast input queues 140 responsive to their respective output identifiers. Multicast data cells 112 are queued in the multicast input queues 150.

At a step 222, each input 110 examines its unicast input queues 140 and generates a request to each output 130 for which its associated input queue 140 is nonempty. Each input 110 also examines its multicast input queue 150, and generates a further request to each output 130 which is an output destination for the lead data cell 112 in the multicast input queues 150.

At a step 223, each output 130 examines the requests it has received and selects (grants) the request which has the highest priority. If there is more than one such request (there are multiple requests with the same priority and there is no request with higher priority), the output 130 selects the request with the highest precedence. The output 130 generates a grant in response to the selected request.

For each output 130, the request with the highest precedence is the one from the input 110 which is nearest to (for unicast requests) the individual grant precedence pointer 131 for that output 110, or nearest to (for multicast requests) the group grant precedence pointer 132.

At a step 224, each input 110 examines the grants it has received, associates each grant with a request it generated, and selects (accepts) that grant with the associated request with the highest priority. If there is more than one such grant (there are multiple requests with the same priority and there is no request with higher priority), the input 110 selects the grant with the highest precedence. The input 110 generates an acceptance in response to the selected grant.

For each input 110, the grant with the highest precedence is the one from the output 130 which is nearest to (for grants on unicast requests) the accept precedence pointer 160 for that input 130.

For multicast requests, each input accepts as many grants as possible.

At a step 225, those grants which have been accepted are scheduled.

At a step 226, those inputs 110 and those outputs 130 which have been scheduled are removed from consideration, and the switch 120 determines if there are any further inputs 110 or outputs 130 to be scheduled, or if any other termination criterion is met. If there further inputs 110 or outputs 130 to be scheduled and no other termination criterion is met, the method continues with the step 222, and the technique is re-applied (retriggered) to those inputs 110 and those outputs 130 which remain for consideration. Otherwise, the method continues with the step 227.

In a preferred embodiment, the method also terminates after a fixed number (such as four) of scheduling reapplications have been performed. However, in alternative embodiments, other termination criteria may include expiration of a timer, or there may be no other termination criteria.

At a step 227, when scheduling of inputs and outputs is complete, data cells are transmitted according to the schedule and precedence pointers are updated.

For each input 110, the accept precedence pointer 160 is updated to the next output 130 (thus, one output 130 past the output 130 scheduled by that input 110) if and only if a data cell 112 was transmitted by that input 110. For each output 130, the individual grant precedence pointer 131 is updated to the next input 110 (thus, one input 110 past the input 110 scheduled by that output 130) if and only if a unicast data cell 112 was transmitted to that output 130.

The group grant precedence pointer 132 is updated to the next input 110 if and only if a multicast data cell 112 was completely transmitted to all its designated outputs 130. If the multicast data cell 112 was transmitted to only some of its designated outputs 130, the group grant precedence pointer 132 is not updated, and remains pointing to the input 110 having that multicast data cell 112. The multicast data cell 112 itself is updated to indicate that it was transmitted to some, but not all, of its designated outputs 130.

In a preferred embodiment, the group grant precedence pointer 132 is updated only for completely transmitted multicast data cells 112, so that multicast data cells 112 can be completely cleared from their inputs 110. However, in alternative embodiments, the group grant precedence pointer 132 may be updated on other conditions, such as when multicast data cells 112 are partially transmitted to any of their designated outputs 130, to a majority of their designated outputs 130, to any selected fraction of their designated outputs 130, or some other condition.

Alternative Embodiments

Although preferred embodiments are disclosed herein, many variations are possible which remain within the concept, scope, and spirit of the invention, and these variations would become clear to those skilled in the art after perusal of this application.

I claim:

1. A system for scheduling unicast and multicast cells in a nonblocking switch having a plurality of inputs and a plurality of outputs, said cells each having a designated output and a priority, said system including
    a plurality of unicast input queues at each input;
    a multicast input queue at each input;
    means for each one input to request service, at a scheduling time, from said designated outputs for cells queued at said one input;
    means for each output to grant requests responsive to said priority and responsive to a grant precedence for said requests utilizing a pointer; and
    means for each input to accept grants responsive to said priority and responsive to an accept precedence for said grant utilizing a pointer.

2. A system as in claim 1, wherein said cells are of substantially uniform size.

3. A system as in claim 1, wherein said means for each one input to request service is operative to make one said request for a unicast cell and one said request for a multicast cell.

4. A system as in claim 1, wherein said means to grant requests is operative to grant requests for a higher priority cell in preference to requests for a lower priority cell.

5. A system as in claim 1, wherein said grant precedence at each said output is responsive to an individual grant precedence pointer for unicast cells and responsive to a group grant precedence pointer for multicast cells.

6. A system as in claim 1, wherein said grant precedence is responsive to whether requests are for unicast cells or for multicast cells.

7. A system as in claim 1, wherein said grant precedence is operative to prefer unicast cells at a first set of times and is operative to prefer multicast cells at a second set of times.

8. A system as in claim 1, wherein said means to accept grants is operative to accept grants for a higher priority cell in preference to requests for a lower priority cell.

9. A system as in claim 1, wherein said accept precedence at each said input is responsive to an accept precedence pointer for unicast cells.

10. A system as in claim 1, wherein said means to accept grants at said one input is operative to accept substantially all grants for multicast cells to be transmitted by said one input.

11. A system as in claim 1, wherein said means to accept grants at said one input is operative to accept all grants for multicast cells to be transmitted by said one input, except only for higher priority grants for unicast cells.

12. A system as in claim 1, wherein said accept precedence is responsive to whether requests are for unicast cells or for multicast cells.

13. A system as in claim 1, wherein said accept precedence is operative to prefer unicast cells at a first set of times and is operative to prefer multicast cells at a second set of times.

14. A system as in claim 1, including
    means for scheduling inputs having accepted grants and outputs associated with said accepted grants; and
    means for retriggering said means to request service, said means to grant requests, and said means to accept grants, for inputs and outputs not already scheduled.

15. A system as in claim 14, wherein said means for retriggering is operative a selected number of times.

16. A system as in claim 14, wherein said means for retriggering is operative until a selected time.

17. A method for scheduling unicast and multicast cells in a nonblocking switch having a plurality of inputs and a plurality of outputs, said cells each having a designated output and a priority, said method including the steps of, at a scheduling time, requesting service for each one input from said designated outputs for unicast and multicast cells queued at said one input;

granting requests for each output responsive to said priority and responsive to a grant precedence pointer for said requests; and accepting grants for each input responsive to said priority and responsive to an accept precedence pointer for said grant.

18. A method as in claim 17, wherein said cells are of substantially uniform size.

19. A method as in claim 17, wherein said step of requesting service is operative to make one said request for a unicast cell and one said request for a multicast cell, to each one output.

20. A method as in claim 17, wherein said step of granting requests is operative to grant requests for a higher priority cell in preference to requests for a lower priority cell.

21. A method as in claim 17, wherein said grant precedence at each said output is responsive to an individual grant precedence pointer for unicast cells and responsive to a group grant precedence pointer for multicast cells.

22. A method as in claim 17, wherein said grant precedence is responsive to whether requests are for unicast cells or for multicast cells.

23. A method as in claim 17, wherein said grant precedence is operative to prefer unicast cells at a first set of times and is operative to prefer multicast cells at a second set of times.

24. A method as in claim 17, wherein said step of accepting grants is operative to accept grants for a higher priority cell in preference to requests for a lower priority cell.

25. A method as in claim 17, wherein said accept precedence at each said input is responsive to an accept precedence pointer for unicast cells.

26. A method as in claim 17, wherein said step of accepting grants at said one input is operative to accept substantially all grants for multicast cells to be transmitted by said one input.

27. A method as in claim 17, wherein said accept precedence is responsive to whether requests are for unicast cells or for multicast cells.

28. A method as in claim 17, wherein said accept precedence is operative to prefer unicast cells at a first set of times and is operative to prefer multicast cells at a second set of times.

29. A method as in claim 17, including the steps of scheduling inputs having accepted grants and outputs associated with said accepted grants; and reperforming said step of requesting service, said step of granting requests, and said step of accepting grants, for inputs and outputs not already scheduled.

30. A method as in claim 29, wherein said step of reperforming is operative a selected number of times.

31. A method as in claim 29, wherein said step of reperforming is operative until a selected time.

32. In an input-queued system for scheduling unicast and multicast cells in a nonblocking switch having a plurality of inputs and a plurality of outputs, said cells each having a designated output and a priority, a memory including a plurality of unicast input queues at each input;

a multicast input queue at each input;

at each said input, an accept precedence pointer indicative of one of said outputs;

at each said output, an individual grant precedence pointer indicative of one of said inputs; and a group grant precedence pointer indicative of one of said inputs.

33. A memory as in claim 32, further including at each one input a request for service from said designated outputs for cells queued at said one input.

34. A memory as in claim 33, including one said request for a unicast cell and one said request for a multicast cell.

35. A memory as in claim 33, further including at each output a grant of service, said grant of service having been generated responsive to said priority and responsive to said individual grant precedence pointer and said group grant precedence pointer.

36. A memory as in claim 35, said grant of service having been generated responsive to said individual grant precedence pointer for unicast cells and responsive to said group grant precedence pointer for multicast cells.

37. A memory as in claim 35, said grant of service having been generated responsive to whether requests are for unicast cells or for multicast cells.

38. A memory as in claim 35, further including at each input an acceptance of grant, said acceptance of grant having been generated responsive to said priority and responsive to said accept precedence pointer.

39. A memory as in claim 38, including one said acceptance of grant for substantially all grants for multicast cells to be transmitted by said one input.

40. A memory as in claim 38, said acceptance of grant having been generated responsive to said accept precedence pointer for unicast cells.

41. A memory as in claim 38, said acceptance of grant having been generated responsive to whether requests are for unicast cells or for multicast cells.

\* \* \* \* \*